United States Patent
Tsai

(10) Patent No.: US 9,110,805 B1
(45) Date of Patent: Aug. 18, 2015

(54) PREVENTING DEVICE POWER ON AFTER UNRECOVERABLE ERROR

(71) Applicant: Quanta Computer Inc., Tao Yuan Shien (TW)

(72) Inventor: Chin-Fu Tsai, Tao Yuan Shien (TW)

(73) Assignee: Quanta Computer Inc., Tao Yuan Shien (TW)

( * ) Notice: Subject to any disclaimer, the term of this patent is extended or adjusted under 35 U.S.C. 154(b) by 0 days.

(21) Appl. No.: 14/524,874

(22) Filed: Oct. 27, 2014

(51) Int. Cl.
*G06F 11/00* (2006.01)
*G06F 11/07* (2006.01)
*G06F 1/30* (2006.01)

(52) U.S. Cl.
CPC ............. *G06F 11/0793* (2013.01); *G06F 1/30* (2013.01)

(58) Field of Classification Search
CPC ..... G06F 11/28; G06F 11/30; G06F 11/1441; G06F 11/0793
See application file for complete search history.

(56) References Cited

U.S. PATENT DOCUMENTS

| | | |
|---|---|---|
| 5,151,907 A | 9/1992 | Robbins |
| 5,528,446 A | 6/1996 | Sankaran et al. |
| 5,581,692 A | 12/1996 | Nevitt et al. |
| 5,648,759 A | 7/1997 | Miller |
| 6,081,752 A * | 6/2000 | Benson et al. ................ 700/79 |
| 6,772,357 B2 * | 8/2004 | Billick et al. ................ 713/340 |
| 6,813,525 B2 | 11/2004 | Reid et al. |
| 7,089,451 B2 | 8/2006 | Ote et al. |
| 7,131,013 B2 | 10/2006 | Sasakura et al. |
| 7,908,505 B2 * | 3/2011 | Malik et al. ................... 713/340 |
| 8,107,945 B2 | 1/2012 | Hoffner et al. |
| 8,271,819 B2 * | 9/2012 | Breen et al. ................... 713/330 |
| 8,364,338 B2 | 1/2013 | Peltonen et al. |
| 2003/0204777 A1 * | 10/2003 | Kojori ............................ 714/14 |
| 2004/0078655 A1 | 4/2004 | Sung |
| 2005/0164694 A1 | 7/2005 | Kim |
| 2011/0307746 A1 | 12/2011 | Sullivan et al. |
| 2011/0320834 A1 * | 12/2011 | Ingels et al. .................. 713/310 |
| 2013/0289789 A1 * | 10/2013 | Ewing et al. .................. 700/295 |

FOREIGN PATENT DOCUMENTS

CN 202978234 6/2013

* cited by examiner

*Primary Examiner* — Michael Maskulinski
(74) *Attorney, Agent, or Firm* — Novak Druce Connolly Bove + Quigg LLP

(57) ABSTRACT

In some implementations, a system controller of a computing device can be configured to receive a power-on signal and prevent the computing device from providing power to components of the computing device. In some implementations, upon receiving a power-on signal, the system controller can retrieve fault data from a power supply unit. The fault data can be analyzed to determine whether the power supply unit detected an unrecoverable failure. When an unrecoverable failure is detected, the system controller can prevent the power supply unit from providing power to other components of the computing device. In some implementations, an unrecoverable failure can be detected when the fault data indicates that an overcurrent, an overvoltage, or an over-temperature fault has occurred.

21 Claims, 3 Drawing Sheets

PREVENTING DEVICE POWER ON AFTER UNRECOVERABLE ERROR

TECHNICAL FIELD

The disclosure generally relates to server power management.

BACKGROUND

Computing devices are subject to fluctuations in power supplied to the computing devices that may cause damage to components of the computing device. For example, if a motherboard, CPU or other component of the computing devices receives too much current (overcurrent) or too much voltage (overvoltage), the motherboard, CPU or other components of the computing device may be damaged. Repairing computer components can often be costly both in purchase price for the replacement parts and in downtime and labor costs required to fix the damaged computer.

SUMMARY

In some implementations, a system controller of a computing device can be configured to receive a power-on signal and prevent a power supply unit from providing power to components of the computing device. In some implementations, upon receiving a power-on signal, the system controller can retrieve fault data from the power supply unit. The fault data can be analyzed to determine whether the power supply unit detected an unrecoverable failure. When an unrecoverable failure is detected, the system controller can prevent the power supply unit from providing power to other components of the computing device. In some implementations, an unrecoverable failure can be detected when the fault data indicates that an overcurrent, an overvoltage, or an overtemperature fault has occurred.

Particular implementations provide at least the following advantages: A computing device can be protected from attempts to power on the computing device when a power fault has occurred that will cause damage to the computing device when the device is powered on. The owner of the computing device can be spared the expense of replacing components damaged by power related faults.

Details of one or more implementations are set forth in the accompanying drawings and the description below. Other features, aspects, and potential advantages will be apparent from the description and drawings, and from the claims.

DESCRIPTION OF DRAWINGS

Like reference symbols in the various drawings indicate like elements.

DETAILED DESCRIPTION

Figure 1:
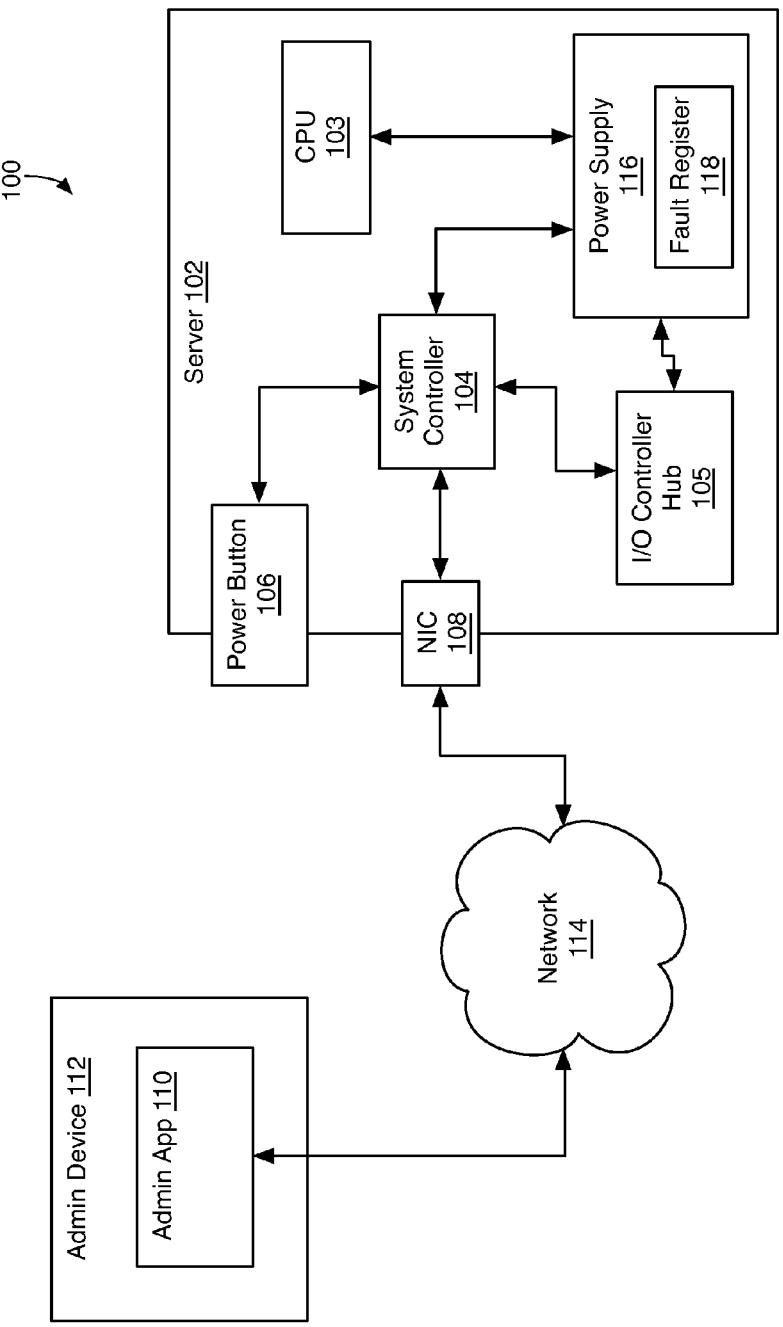
FIG. 1 illustrates an example system for preventing a computing device from powering on after an unrecoverable failure.

FIG. 1 illustrates an example system 100 for preventing a computing device from powering on after an unrecoverable failure. In some implementations, server 102 can be configured with a system controller 104 that can prevent server 104 from powering on after an unrecoverable failure. For example, server 102 can be one of many servers configured in a rack system at a data center. System controller 104 can be a service processor (e.g., a baseboard management processor) that provides operating system independent and/or pre-operating system management of server 102. For example, system controller 104 can be powered and operational even when CPU 103 is powered down. Thus, system controller 104 can provide service and management for hardware configured in server 102 even when the operating system for server 102 is not running.

In some implementations, system controller 104 can be configured to receive power-on signals from power button 106 and/or network interface controller 108. For example, rather than sending an input/output signal directly to I/O controller hub 105 (e.g., a southbridge controller, a platform controller hub, an I/O controller) when an administrator or other user physically presses power button 106, system controller 104 can receive a signal from power button 106 that indicates the user's intent to power on server 102.

Similarly, an administrator, or other user, can use a server administration application 110 on administrative device 112 (e.g., a laptop computer, handheld device, etc.) to send a power on signal through network 114 (e.g., local area network, wide area network, wireless network, Internet, etc.) to the dedicated network interface controller 108 of system controller 104. For example, the signal received by network interface controller 108 can include a command to power on server 102. Network interface controller 108 can send the power-on command to system controller 104 to cause system controller 104 to power on server 102.

In some implementations, system controller 104 can request power supply fault values from power supply 116. For example, when power supply 116 is turned on and/or supplying power to server 102, power supply 116 may detect a power supply fault or error. For example, power supply 116 can detect when power supply 116 is conducting an excess (e.g., greater than a specified amount) of current (overcurrent) to server 102. Power supply 116 can detect when power supply 116 is conducting an excess amount of voltage (overvoltage) to server 102. Power supply 116 can detect when server 102 is generating over a specified amount of heat (overtemperature). When power supply 116 detects overcurrent, overvolatage, or overtemperature, power supply 116 can store a value in fault register 118 that indicates the detected fault and shutdown server 102. For example, fault register can store a series of bits that indicate what type of fault was detected. Each bit (e.g., an overcurrent bit, an overvoltage bit, an overtemperature bit, etc.) can have a value of zero or one, where a value of one indicates that the corresponding fault occurred and a value of zero indicates that the corresponding fault did not occur. When system controller 104 requests the fault values from power supply 116, power supply 116 can send the values of the fault bits stored in fault register 118 to system controller 104. In some implementations, system controller 104 can store the fault values in a memory (e.g., non-volatile memory) corresponding to system controller 104.

In some implementations, system controller 104 can prevent server 102 from powering on. For example, when system controller 104 receives the power supply fault bits from power supply 116, system controller 104 can determine whether any of the bits are set to a value of "1." When the overcurrent bit, overvoltage bit or overtemperature bit are set to a value of "1," system controller 104 can prevent the power on signal received from power button 106 or network interface controller 108 from being sent to I/O controller hub 105.

For example, in typical systems, I/O controller hub 105 would receive the input from power button 106 or network interface controller 108 and, in turn, send a signal to power supply 116 to turn on server 102 (e.g., send power to CPU 103). Instead, system 100 is configured to allow system controller 104 to receive the power on signals from power button 106 and/or network interface controller 108 and mediate whether the signal should be passed on to I/O controller hub 105 to power on the system based on the power supply fault values.

In some implementations, system controller 104 can allow server 102 to power on. For example, when system controller 104 receives the fault values from power supply 116 and the fault bit values indicate that no power supply fault has occurred (e.g., all of the fault bits are zero), then system controller 104 can send a power on signal to I/O controller hub 105. I/O controller hub 105 can then cause power supply 116 to power on and supply power to CPU 103 and other components of server 102.

Figure 2:
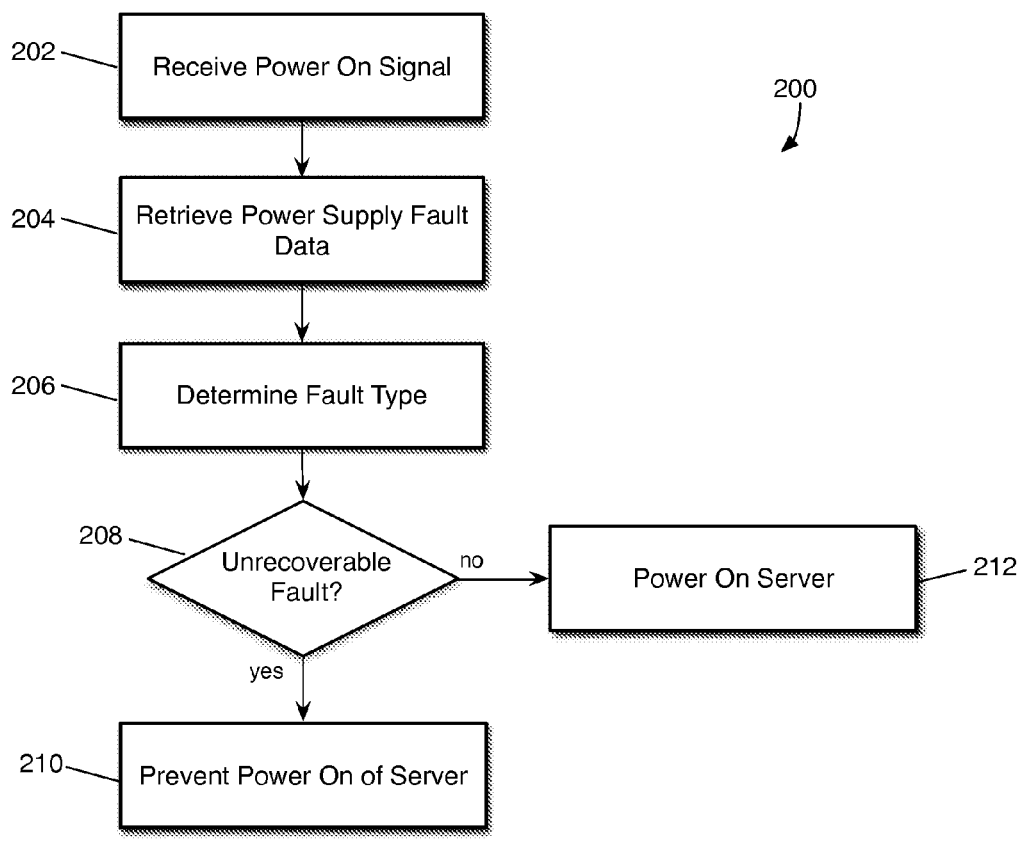
FIG. 2 is a block diagram of an example process for preventing a computing device from powering on after an unrecoverable failure.

FIG. 2 is a block diagram of an example process 200 for preventing a computing device from powering on after an unrecoverable failure. At step 202, a system controller can receive a power on signal. For example, a computing device (e.g., a server) can be configured with a system controller. When the server is shutdown (e.g., powered off), the system controller (e.g., a baseboard management controller) can receive a power on signal from a power button or a network interface. The system controller can receive the signal when the server is shutdown and powered off because the system controller is configured to receive electrical power and operate even when the server is turned off.

At step 204, the system controller can retrieve power supply fault data from the server's power supply. For example, in response to receiving the power on signal, the system controller can send a request to the power supply for the data in the power supply's fault register. In response to the request from the system controller, the power supply can send the bit values in the fault register to the system controller. Alternatively, the system controller can periodically request power supply fault data during operation of the server and store the power supply fault data in memory corresponding to the system controller. System controller can retrieve the power supply fault data from its local memory when determining a power supply fault type.

At step 206, the system controller can determine the power supply fault type. For example, the each bit value received from the power supply can correspond to fault (e.g., error, failure, etc.) type. If the bit corresponding to a particular fault type is turned on (e.g., has a value of one), then the particular fault type has occurred. If the bit corresponding to a particular fault type is turned off (e.g., has a value of zero), then the particular fault type has not occurred. Thus, if a bit corresponding to an overcurrent fault has a value of one, the power supply detected an overcurrent when the server was last running, updated the power supply's fault register and shutdown.

At step 208, the system controller can determine whether the power supply detected an unrecoverable power supply fault. For example, if the fault register bit values received at step 206 indicate that an overcurrent fault, an overvoltage fault, or an overtemperature fault occurred, the system controller can determine that an unrecoverable power supply fault has occurred.

At step 210, the system controller can prevent the server from powering on. For example, when the system controller determines that an unrecoverable power supply fault has occurred, the system controller can prevent the power on signal from reaching the server's I/O controller hub and the server's power supply. In some implementations, unplugging the server or replacing the server's power supply can reset the power supply's fault bits and allow the server to be powered on.

At step 212, the system controller can power on the server. For example, when the system controller determines that no power supply fault has occurred, the system controller can send the power on signal received from the power button or from the network interface controller to the server's I/O controller hub. In turn, the server's I/O controller hub can send a power on signal to the power supply to cause the power supply to provide power to the CPU and other components of the server. Alternatively, the system controller can send a power on signal directly to the power supply to cause the power supply to provide power to the CPU and other components of the server.

Example System Architecture

Figure 3:
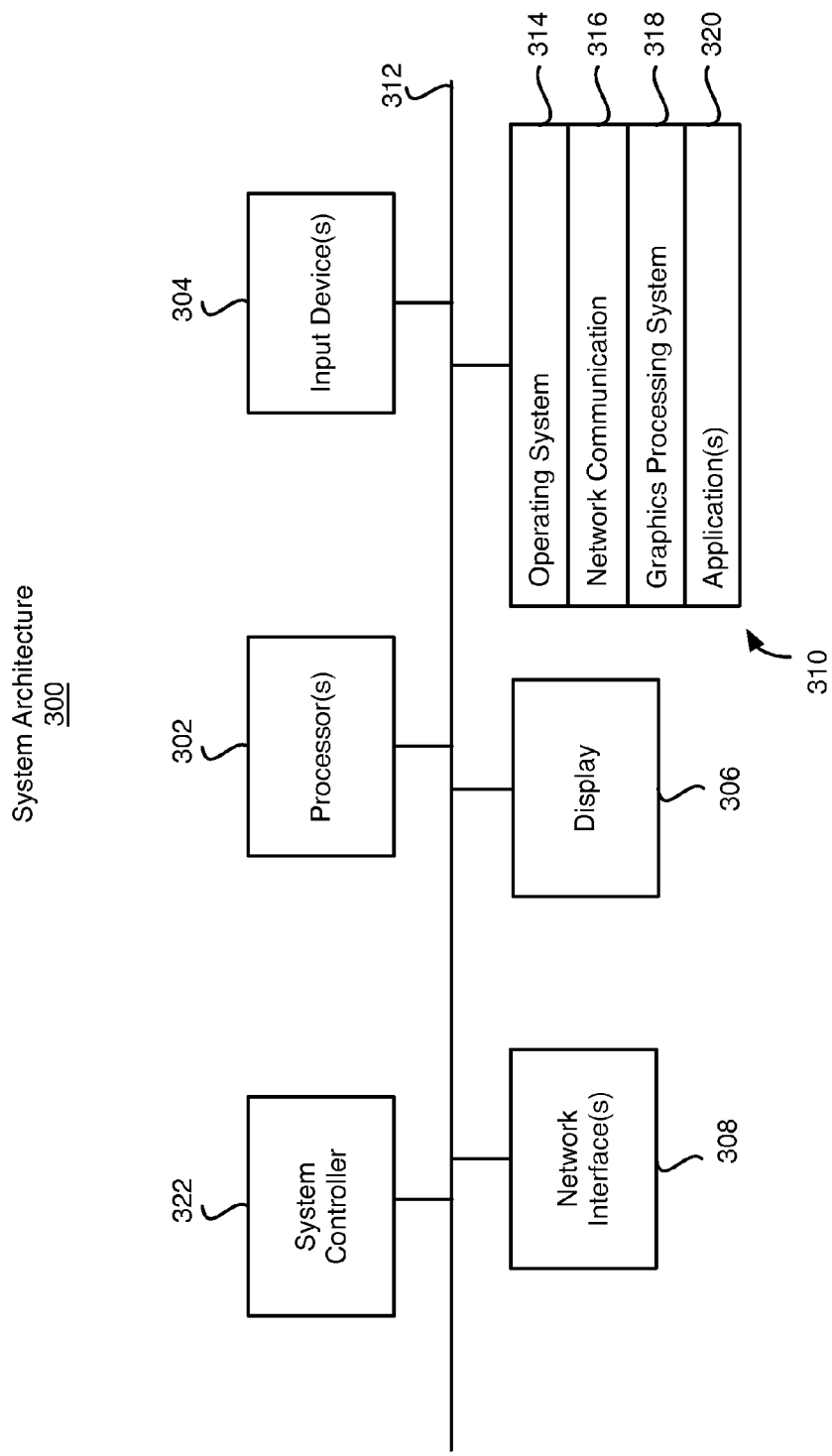
FIG. 3 is a block diagram of an example system architecture implementing the features and processes of FIGS. 1-2.

FIG. 3 is a block diagram of an example system architecture 300 implementing the features and processes of FIGS. 1-2. The architecture 300 can be implemented on any electronic device that runs software applications derived from compiled instructions, including without limitation personal computers, servers, smart phones, media players, electronic tablets, game consoles, email devices, etc. In some implementations, the architecture 300 can include one or more processors 302, one or more input devices 304, one or more display devices 306, one or more network interfaces 308 and one or more computer-readable mediums 310. Each of these components can be coupled by bus 312.

Display device 306 can be any known display technology, including but not limited to display devices using Liquid Crystal Display (LCD) or Light Emitting Diode (LED) technology. Processor(s) 302 can use any known processor technology, including but are not limited to graphics processors and multi-core processors. Input device 304 can be any known input device technology, including but not limited to a keyboard (including a virtual keyboard), mouse, track ball, and touch-sensitive pad or display. Input device 304 can include a power button for turning on and supplying power to processor(s) 302, display 306, network interfaces 308, and/or input devices 304. Bus 312 can be any known internal or external bus technology, including but not limited to ISA, EISA, PCI, PCI Express, NuBus, USB, Serial ATA or FireWire.

Computer-readable medium 310 can be any medium that participates in providing instructions to processor(s) 302 for execution, including without limitation, non-volatile storage media (e.g., optical disks, magnetic disks, flash drives, etc.) or volatile media (e.g., SDRAM, ROM, etc.). Computer-readable medium 310 can provide instructions to system controller 322, for example. Alternatively, the instructions for preventing device power on after unrecoverable failure can be embedded in system controller 322. The computer-readable medium (e.g., storage devices, mediums, and memories) can include, for example, a cable or wireless signal containing a bit stream and the like. However, when mentioned, non-transitory computer-readable storage media expressly exclude media such as energy, carrier signals, electromagnetic waves, and signals per se.

Computer-readable medium 310 can include various instructions for implementing an operating system 314 (e.g., Mac OS®, Windows®, Linux). Operating system 314 can be multi-user, multiprocessing, multitasking, multithreading, real-time and the like. Operating system 314 performs basic tasks, including but not limited to: recognizing input from input device 304; sending output to display device 306; keeping track of files and directories on computer-readable medium 310; controlling peripheral devices (e.g., disk drives, printers, etc.) which can be controlled directly or through an I/O controller; and managing traffic on bus 312. Network communications instructions 316 can establish and maintain network connections (e.g., software for implementing communication protocols, such as TCP/IP, HTTP, Ethernet, etc.).

A graphics processing system 318 can include instructions that provide graphics and image processing capabilities. For example, the graphics processing system 318 can implement the processes described with reference to FIGS. 1-2. Application(s) 320 can be an application that uses or implements the processes described in reference to FIGS. 1-2. The processes can also be implemented in operating system 314.

System controller 322 can be a service controller that operates independently of processor(s) 302 and/or operating system 314. In some implementations, system controller 322 can be powered and operational before processor(s) 302 are powered on and operating system 314 is loaded into processor(s) 302. For example, system controller 322 can provide for pre-OS management of the computing device through a dedicated network interface or other input device. For example, system controller 322 can be a baseboard management controller (BMC) that monitors device sensors (e.g., voltages, temperature, fans, etc.), logs events for failure analysis, provides LED guided diagnostics, performs power management, and/or provides remote management capabilities through an intelligent platform management interface (IMPI), keyboard, video, and mouse (KVM) redirection, serial over LAN (SOL), and/or other interfaces.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

One or more features or steps of the disclosed embodiments can be implemented using an API. An API can define on or more parameters that are passed between a calling application and other software code (e.g., an operating system, library routine, function) that provides a service, that provides data, or that performs an operation or a computation.

The API can be implemented as one or more calls in program code that send or receive one or more parameters through a parameter list or other structure based on a call convention defined in an API specification document. A parameter can be a constant, a key, a data structure, an object, an object class, a variable, a data type, a pointer, an array, a list, or another call. API calls and parameters can be implemented in any programming language. The programming language can define the vocabulary and calling convention that a programmer will employ to access functions supporting the API.

In some implementations, an API call can report to an application the capabilities of a device running the application, such as input capability, output capability, processing capability, power capability, communications capability, etc.

A number of implementations have been described. Nevertheless, it will be understood that various modifications may be made. For example, other steps may be provided, or steps may be eliminated, from the described flows, and other components may be added to, or removed from, the described systems. Accordingly, other implementations are within the scope of the following claims.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method comprising:
   receiving, at a system controller of a computing device, a signal to power on the computing device;
   obtaining, by the system controller, power supply fault data from a power supply of the computing device;
   determining, by the system controller, that the power supply detected an unrecoverable fault based on the fault data; and
   preventing the power supply from powering on the computing device.

2. The method of claim 1, wherein the system controller receives the signal from a power button configured on the computing device.

3. The method of claim 1, wherein the system controller receives the signal from a network interface controller, the signal including a command to power on the computing device.

4. The method of claim 1, wherein the system controller is a baseboard management controller.

5. The method of claim 1, wherein the unrecoverable fault is an overcurrent fault.

6. The method of claim 1, wherein the unrecoverable fault is an overvoltage fault.

7. The method of claim 1, wherein the unrecoverable fault is an overtemperature fault.

8. A non-transitory computer-readable medium including one or more sequences of instructions which, when executed by a system controller, causes:
   receiving, at the system controller of a computing device, a signal to power on the computing device;
   obtaining, by the system controller, power supply fault data from a power supply of the computing device;
   determining, by the system controller, that the power supply detected an unrecoverable fault based on the fault data; and
   preventing the power supply from powering on the computing device.

9. The non-transitory computer-readable medium of claim 8, wherein the system controller receives the signal from a power button configured on the computing device.

10. The non-transitory computer-readable medium of claim 8, wherein the system controller receives the signal from a network interface controller, the signal including a command to power on the computing device.

11. The non-transitory computer-readable medium of claim 8, wherein the system controller is a baseboard management controller.

12. The non-transitory computer-readable medium of claim 8, wherein the unrecoverable fault is an overcurrent fault.

13. The non-transitory computer-readable medium of claim 8, wherein the unrecoverable fault is an overvoltage fault.

14. The non-transitory computer-readable medium of claim 8, wherein the unrecoverable fault is an overtemperature fault.

15. A system comprising:
   a power supply;
   one or more processors;
   a system controller; and
   a non-transitory computer-readable medium including one or more sequences of instructions which, when executed by the system controller, causes:
      receiving, at the system controller of the system, a signal to power on the system, where the one or more processors are powered down when the signal is received;
      obtaining, by the system controller, power supply fault data from the power supply of the system;
      determining, by the system controller, that the power supply detected an unrecoverable fault based on the fault data; and
      preventing the power supply from powering on the system.

16. The system of claim 15, wherein the system controller receives the signal from a power button configured on the computing device.

17. The system of claim 15, wherein the system controller receives the signal from a network interface controller, the signal including a command to power on the computing device.

18. The system of claim 15, wherein the system controller is a baseboard management controller.

19. The system of claim 15, wherein the unrecoverable fault is an overcurrent fault.

20. The system of claim 15, wherein the unrecoverable fault is an overvoltage fault.

21. The system of claim 15, wherein the unrecoverable fault is an overtemperature fault.

* * * * *